US009699257B2

(12) United States Patent
Lin et al.

(10) Patent No.: US 9,699,257 B2
(45) Date of Patent: *Jul. 4, 2017

(54) ONLINE BUSINESS METHOD, SYSTEM AND APPARATUS BASED ON OPEN APPLICATION PROGRAMMING INTERFACE

(71) Applicant: Alibaba Group Holding Limited, Grand Cayman (KY)

(72) Inventors: Tao Lin, Hangzhou (CN); Junxu Li, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/819,307

(22) Filed: Aug. 5, 2015

(65) Prior Publication Data
US 2015/0341451 A1 Nov. 26, 2015

Related U.S. Application Data

(63) Continuation of application No. 13/257,225, filed as application No. PCT/US2011/036813 on May 17, 2011, now Pat. No. 9,146,786.

(51) Int. Cl.
*H04L 29/08* (2006.01)
*G06F 21/31* (2013.01)
(Continued)

(52) U.S. Cl.
CPC ............... *H04L 67/18* (2013.01); *G06F 9/54* (2013.01); *G06F 21/31* (2013.01); *G06F 21/33* (2013.01); *H04L 67/20* (2013.01)

(58) Field of Classification Search
USPC ............ 726/3, 2, 21, 36; 713/150, 163, 181; 380/255, 264, 276
See application file for complete search history.

(56) References Cited

U.S. PATENT DOCUMENTS 7,734,515 B1 6/2010 Frederick et al.
7,797,198 B1 9/2010 Frederick et al.
(Continued)

FOREIGN PATENT DOCUMENTS

CN 101562621 A 10/2009
JP 2003256223 A 9/2003
(Continued)

OTHER PUBLICATIONS

Chinese Office Action dated Jan. 10, 2014 for Chinese Patent Application No. 201010200821.1 with translation, 6 pages.
(Continued)

*Primary Examiner* — Farid Homayounmehr
*Assistant Examiner* — Sharif E Ullah
(74) *Attorney, Agent, or Firm* — Lee & Hayes, PLLC

(57) ABSTRACT

The present disclosure introduces a method, a system and an apparatus of implementing online transaction according to Open API. In one aspect, a method includes: receiving a first invocation request to invoke an Open API from a third party development server according to a user's transaction request; determining an ISP server corresponding to the Open API as requested to be invoked in the invocation request; sending the first invocation request to the determined ISP server; receiving a service page returned by the ISP server according to the first invocation request; and sending the service page to the third party development server for processing the service page and sending the processed service page to the user, the processing comprising embedding the service page into a page corresponding to the transaction request.

20 Claims, 12 Drawing Sheets

(51) Int. Cl.
*G06F 21/33* (2013.01)
*G06F 9/54* (2006.01)

(56) References Cited

U.S. PATENT DOCUMENTS

| | | | |
|---|---|---|---|
| 2003/0225823 | A1 | 12/2003 | Meeuwissen et al. |
| 2004/0088349 | A1* | 5/2004 | Beck .................. H04L 63/0407 709/203 |
| 2004/0133478 | A1 | 7/2004 | Leahy et al. |
| 2004/0133660 | A1 | 7/2004 | Junghuber et al. |
| 2006/0165060 | A1* | 7/2006 | Dua ....................... G06Q 20/20 370/352 |
| 2007/0130293 | A1 | 6/2007 | Dong et al. |
| 2007/0165615 | A1 | 7/2007 | Shin et al. |
| 2007/0168744 | A1 | 7/2007 | Pal et al. |
| 2007/0208823 | A1* | 9/2007 | Shannon ........... G06F 17/30997 709/217 |
| 2008/0313615 | A1 | 12/2008 | Cai et al. |
| 2009/0217311 | A1* | 8/2009 | Kocyan .................. G06F 9/541 719/328 |
| 2009/0234713 | A1* | 9/2009 | Bi .......................... G06Q 30/02 705/14.54 |
| 2009/0268715 | A1 | 10/2009 | Jansson |
| 2009/0320050 | A1 | 12/2009 | Pousti et al. |
| 2009/0328063 | A1 | 12/2009 | Corvera et al. |
| 2010/0011342 | A1 | 1/2010 | Bhattacharyya et al. |
| 2010/0011343 | A1 | 1/2010 | Bhattacharyya et al. |
| 2010/0011376 | A1 | 1/2010 | Bhattacharyya et al. |
| 2010/0218237 | A1 | 8/2010 | Ferris et al. |
| 2010/0329238 | A1 | 12/2010 | Wilde et al. |

FOREIGN PATENT DOCUMENTS

| | | |
|---|---|---|
| JP | 2004164313 A | 6/2004 |
| JP | 2005216303 A | 8/2005 |
| JP | 2008210191 A | 9/2008 |
| JP | 2009518724 A | 5/2009 |
| WO | WO03052615 | 6/2003 |
| WO | WO2010001871 A1 | 1/2010 |

OTHER PUBLICATIONS

The Chinese Office Action mailed Jun. 4 ,2013 for Chinese patent application No. 201010200821.1, a counterpart foreign application of U.S. Appl. No. 13/257,225, 34 pages.

The Extended European Search Report mailed Apr. 4, 2014 for European patent application No. 11792846.5, 7 pages.

Graf, "Modern Dictionary of Electronics", Sixth Edition, Howard W. Sams & Company, pp. 780-781.

The Japanese Office Action mailed Apr. 7, 2015 for Japanese patent application No. 2013-514186, a counterpart foreign application of U.S. Appl. No. 13/257,225, 8 pages.

Office Action for U.S. Appl. No. 13/257,225, mailed on Dec. 4, 2014, Tao Lin, "Online Business Method, System and Apparatus Based on Open Application Programming Interface", 15 pages.

Non-Final Office Action for U.S. Appl. No. 13/257,225, mailed on Feb. 15, 2013, Tao Lin et al., "Online Business Method, System and Apparatus Based on Open Application Programming Interface", 19 pages.

Office Action for U.S. Appl. No. 13/257,225, mailed on Mar. 13, 2014, Tao Lin, "Online Business Method, System and Apparatus Based on Open Application Programming Interface", 22 pages.

Office action for U.S. Appl. No. 13/257,225, mailed on Jul. 29, 2014, Lin et al., "Online Business Method, System and Apparatus Based on Open Application Programming Interface", 24 pages.

Office action for U.S. Appl. No. 13/257,225, mailed on Sep. 5, 2013, Lin et al., "Online Business Method, System and Apparatus Based on Open Application Programming Interface", 24 pages.

The PCT Search Report and Written Opinion mailed Aug. 22, 2011 for PCT application No. PCT/US11/36813, 9 pages.

The European Office Action mailed Dec. 12, 2016 for European Patent Application No. 11792846.5, a counterpart foreign application of U.S. Pat. No. 9,146,786, 6 pages.

\* cited by examiner

ONLINE BUSINESS METHOD, SYSTEM AND APPARATUS BASED ON OPEN APPLICATION PROGRAMMING INTERFACE

CROSS REFERENCE TO RELATED PATENT APPLICATIONS

This application is a continuation of and claims priority to, co-pending, commonly owned the U.S. application Ser. No. 13/257,225 filed on Sep. 16, 2011 entitled "Online Business Method, System and Apparatus Based on Open Application Programming Interface," which is the national stage application claiming priority to international patent application PCT/US11/36813, filed May 17, 2011, which claims priority from Chinese Patent Application No. 201010200821.1, filed Jun. 10, 2010, entitled "Online Business Method, System and Apparatus Based on Open Application Programming Interface," which applications are hereby incorporated in their entirety by reference.

TECHNICAL FIELD

The present disclosure relates to the field of network communication and, more specifically, to a method of implementing network transactions based on Open Application Programming Interface (API), and a system and an apparatus thereof.

BACKGROUND OF THE PRESENT DISCLOSURE

Open API is a common application interface under the Software as a Service (SaaS) model. An Internet Service Provider (ISP) embeds its available website services as a series of APIs and opens them to a third party developer, for example an Independent Software Vendor (ISV), and the ISV employs the corresponding business through its ISV server. Such a method is called an Open-website API, and the opened API is referred to as Open API.

More and more, ISVs intend to develop applications based on Open API provided by the ISP which in turn receive more network traffic flows and market shares. For ISVs, a great amount of investment in hardware and techniques is not necessary to meet the requirements of its business, and hence the investment cost is reduced. Accordingly, as the development base of internet online services, Open API has become a good choice for more and more internet enterprises to develop services and has potential for further development.

Due to the application prospects of Open API, the ISPs of international and domestic websites release their own Open API websites (i.e., the websites of online business based on Open API). Currently, the popular Open API is Representational State Transfer (REST) API, which is based on the REST interface. While implementing online business through the REST API, REST services are sent to business implementation servers by adopting HTTP GET through the Internet. Business implementation servers respond to REST services by adopting POST. The business implementation servers take the structural data, such as XML, Jason, etc., as the returned result to respond to REST services.

The above solution of implementing online business based on the REST API has some disadvantages. First, the structural data, as the returned result, is easy to read for ISVs. However, it is not desirable that the business data provided by general business implementation servers be obtained by any third party (e.g., the ISVs) other than the users. Thus, concerning the business implementation servers, security of data related to an online business implemented by the above solution is low. Second, most of the current online businesses involve complicated business logic operations which require multiple interactions between the user and the service provider. In the conventional method of implementing online business, a REST API can only implement one single interaction between the user and the service provider, such as inquiry, data update, etc. For complicated online business, an ISV needs to construct multiple REST APIs to implement a complete flow, which requires the ISV to analyze the business logics among multiple API invocations. However, this makes the method hard to use. This, coupled with the differences of analysis capability between different ISVs, renders it difficult to achieve guaranteed consistency in business. Consequently, the controllability of business is poor for business implementation servers.

Given the above, for online business based on existing API, the security of business data is not guaranteed and the controllability is poor.

SUMMARY OF THE DISCLOSURE

The present disclosure introduces a method of implementing network transactions based on Open API, and a system and an apparatus thereof are also introduced. Some disadvantages in the conventional technology, such as poor security of business data and poor controllability of business, are eliminated by adopting the present disclosure.

In one aspect, a method of implementing network transactions based on Open API may comprise receiving a first invocation request to invoke an Open API from a third party development server according to a user's transaction request; determining an ISP server corresponding to the Open API as requested to be invoked in the invocation request; sending the first invocation request to the determined ISP server; receiving a service page returned by the ISP server according to the first invocation request; and sending the service page to the third party development server for processing the service page and sending the processed service page to the user, the processing comprising embedding the service page into a page corresponding to the transaction request. The transaction request may, in one implementation, pertain to a business request.

In an event that the Open API as requested to be invoked comprises a plurality of Open APIs, then before sending the first invocation request to the determined ISP server, the method may further comprise determining an invocation relationship among the plurality of Open APIs; and sending the first invocation request to the determined ISP server. The act of sending may comprise, in an event that an invocation sequence exists among the plurality of Open APIs according to the invocation relationship, sending the first invocation request to an ISP server corresponding to a first Open API which is first-ranked in the invocation sequence of the plurality of Open APIs; and in an event that an invocation sequence does not exist among the plurality of Open APIs according to the invocation relationship, sending the first invocation request to a plurality of ISP servers each of which corresponding to a respective one of the plurality of Open APIs.

In an event that an invocation sequence exists among the plurality of Open APIs according to the invocation relationship, then before sending the service page to the third party development server, the method may further comprise embedding in the service page the invocation sequence of the plurality of Open APIs.

The method may further comprise receiving a second invocation request to invoke a second Open API which is after the first Open API according to the invocation sequence and embedded in the service page; sending the second invocation request to an ISP server corresponding to the second Open API; receiving a service page from the ISP server corresponding to the second Open API according to the second invocation request; and sending the service page to the third party development server to process the service page by the third party development server and send the processed service page to the user.

Before sending the second invocation request to an ISP server corresponding to the second Open API, the method may further comprise determining, according to the invocation relationship among the plurality of Open APIs, that the second Open API needs to be invoked through the first Open API; sending the second invocation request to the ISP server corresponding to the second Open API; and receiving a service page from the ISP server corresponding to the second Open API in response to the second invocation request The receipt of the service page may be achieved, for example, by sending, from an ISP server corresponding to the first Open API, the sending invocation request to the ISP server corresponding to the second Open API; and receiving a processed service page from the ISP server corresponding to the first Open API, the service page being received by the ISP server corresponding to the first Open API from the ISP server corresponding to the second Open API, the service page being embedded in a service page of the ISP server corresponding to the second Open API.

Embedding the service page into a page corresponding to the transaction request may comprise embedding the service page in the page corresponding to the transaction request in a form of Iframe.

Before determining an ISP corresponding to the Open API as requested to be invoked in the invocation request, the method may further comprise authenticating the user who sends the transaction request.

Authenticating the user who sends the transaction request may comprise creating a user login identification when the user logs in successfully; and determining whether the user login identification is valid when the user login identification is updated each time when the user sends a respective transaction request.

In an event that the determined ISP server corresponding to the Open API as requested to be invoked in the invocation request comprises a plurality of ISP servers, sending the first invocation request to the determined ISP server may comprise employing a random route algorithm to locate one of the determined ISP servers; and sending the first invocation request to the located one of the determined ISP servers.

In another aspect, an apparatus of implementing network transactions based on Open API may comprise a first receiving unit that receives an invocation request to invoke an Open API sent by a third party development server according to a user's transaction request; a first ISP invocation unit that determines an ISP server corresponding to the Open API as requested to be invoked in the invocation request received by the first receiving unit, and sends the invocation request to the determined ISP server; a first invocation result feedback unit that receives a service page returned from the ISP server according to the invocation request sent by the first ISP invocation unit, and sends the service page to the third party development server for processing the service page and sending the processed service page to the user, the processing comprising embedding the service page into a page corresponding to the transaction request.

The first ISP invocation unit may comprise an invoke relationship determination module that determines an invocation relationship among a plurality of Open APIs in an event that the Open API as requested to be invoked in the invocation request received by the first receiving unit comprises the plurality of Open APIs; a first invocation execution module that sends the invocation request to an ISP server corresponding to a first Open API which is in a first place of an invocation sequence of the plurality of Open APIs in an event that the invoke sequence is determined to exist among the plurality of Open APIs according to the invocation relationship determined by the invocation relationship determination module; and a second invocation execution module that sends the invocation request to a plurality of ISP servers individually corresponding to the plurality of Open APIs in an event that the invocation sequence is determined not to exist among the plurality of Open APIs according to the invocation relationship determined by the invocation relationship determination module.

The apparatus may further comprise an invoke relationship embedding unit that embeds the invocation relationship among the plurality of Open APIs to the service page in an event that the invocation sequence is determined to exist among the plurality of Open APIs according to the invocation relationship, and provides the embedded and processed service page to the first invocation result feedback unit.

The apparatus may further comprise a second receiving unit that receives an invocation request to invoke a second Open API which is after the first Open API and is triggered according to the invocation sequence embedded in the service page returned by the first invocation result feedback unit; a second ISP invocation unit that sends the invocation request received by the second receiving unit to an ISP server corresponding to the second Open API; and a second invocation result feedback unit that receives a service page returned from the ISP server corresponding to the second Open API according to the invocation request according to the second ISP invoke unit, and sends the service page to the third party development server for processing the service page and sending the processed service page to the user.

The second ISP invocation unit may comprise an invocation relationship analysis module that determines whether the second Open API should be invoked through the first Open API according to the invocation relationship among the plurality of Open APIs before sending the invocation request received by the second receiving unit to an ISP server corresponding to the second Open API; and an invocation request sending module that forwards the invocation request to an ISP server corresponding to the second Open API in an event that an analysis result of the invocation relationship analysis module is positive. The second invocation result feedback unit may comprise a receiving module that receives a service page processed and returned by the ISP server corresponding to the first Open API, wherein the service page is the service page returned by the ISP server corresponding to the second Open API and received by the ISP server corresponding to the first Open API which embeds in the service page provided by the first Open API; a feedback module that sends the service page received by the receiving module to the third party development server for processing the service page and sending the processed service page to the user.

The apparatus may further comprise an authentication unit that authenticates the user who sends the transaction request, and instructs the first ISP invocation unit to determine an ISP corresponding to Open API as requested to be invoked in the invocation request.

The authentication unit may comprise an authentication module that determines the user authentication in an event that the user meets a setting condition; and an instruction module that instructs the first ISP invocation unit to determine an ISP corresponding to the Open API as requested to be invoked in the invocation request in an event that the authentication module determines the user is authenticated. The setting condition may comprise creating a user login certification when the user logs in successfully; and determining the user login certification is valid. The user login certification may be updated each time when the user sends a transaction request.

The first ISP invoke unit may comprise an ISP server determination module that determines a quantity of ISPs corresponding to the Open API as requested to be invoked in the invocation request; an ISP server selection module that employs a random route algorithm to locate an ISP server in a plurality of ISP servers if the ISP determined by the ISP server determination module comprises the plurality of ISPs, and sends the invocation request to the located ISP server.

In yet another aspect, a system of implementing network transactions based on Open API may comprise a third party development server; a transaction implementation server; and an ISP server. The third party development server may send an invocation request to an Open API to the transaction implementation server according to a user's transaction request, receive a service page returned from the transaction implementation server, and embed the service page into a page corresponding to the transaction request before providing to the user. The transaction implementation server may determine an ISP server corresponding to the Open API as requested in the invocation request in response to the invocation request, send the invocation request to the determined ISP server, receive a service page returned by the ISP server, and send the service page to the third party development server. The ISP server may return a corresponding service page to the transaction implementation server according to the invocation request sent by the transaction implementation server.

According to the present disclosure, concerning the security of data, it is more secure to return service data to a third party development server through a service page than directly returning structural data to the third party development, as with a conventional method. Besides, the third party development server does not need to analyze the business logics as all controllability to business is implemented by the servers between the third party server and the ISPs, and consequently the controllability is enhanced.

DETAILED DESCRIPTION

In order to provide a solution that enhances both data security and controllability for business, the present disclosure provides an online business method, system and apparatus based on Open API. The techniques described below can be utilized in implementing online transactions in the form of a method or an apparatus. These transactions may be business in nature, such as those used in online e-commerce. Preferred embodiments are described below with reference to the figures for illustrative purpose but not to limit the scope of the present disclosure.

Figure 1:
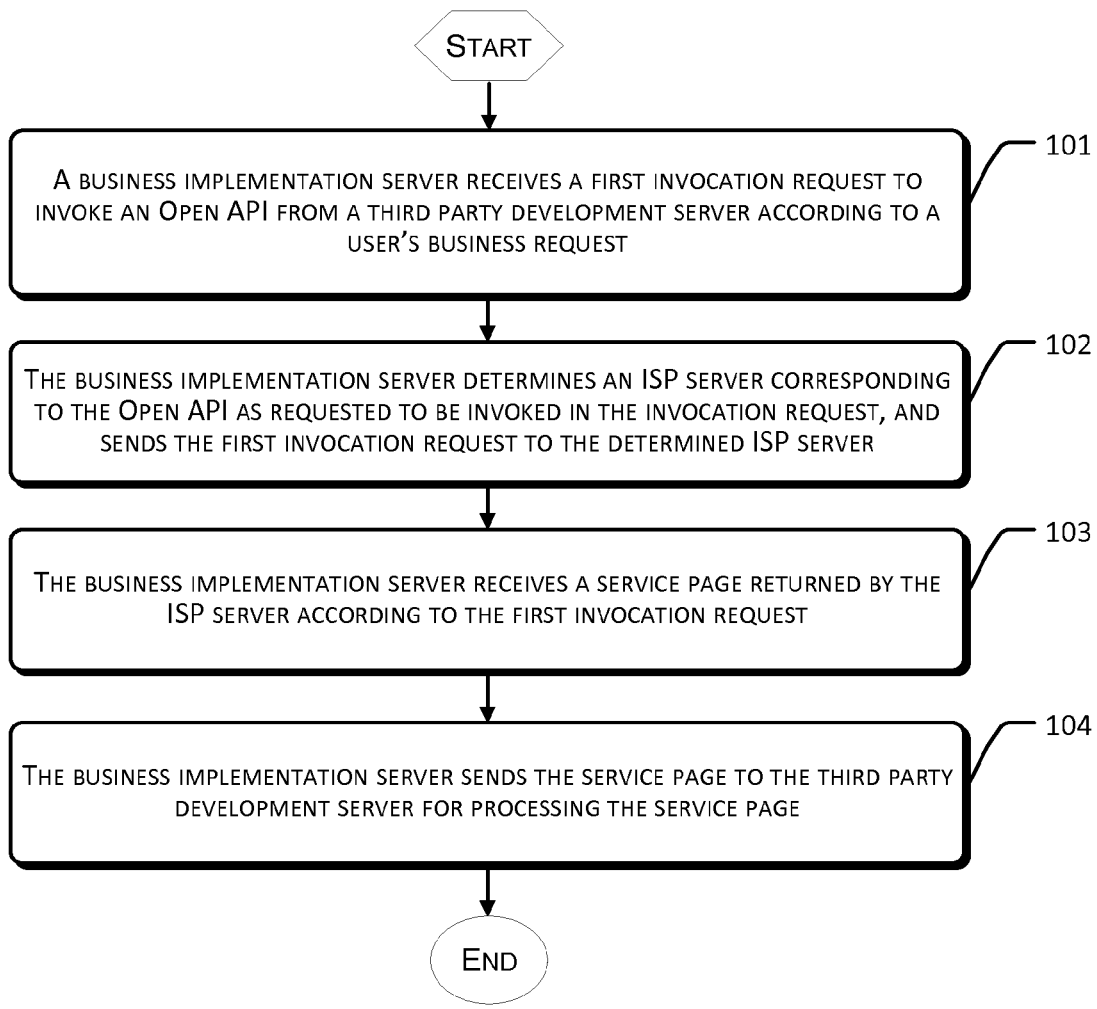
FIG. 1 is flowchart 1 of a method of implementing online business based on Open API in accordance with an embodiment of the present disclosure.

FIG. 1 illustrates a method of implementing online business based on Open API in accordance with an embodiment of the present disclosure. The method includes a number of stages as described below.

Stage 101: a transaction implementation server receives an invocation request for Open API from a third party development server. The request is sent based on a user's transaction request. As noted, the transaction request may, in certain implementations, pertain to a business request for transacting business, such as that used in e-commerce, and hence the transaction implementation server may be further be considered as a business implementation server.

Stage 102: the business implementation server determines an ISP corresponding to the Open API as requested to be invoked in the invocation request and sends the invocation request to the determined ISP server.

Stage 103: the business implementation server receives a service page returned from the ISP server according to the invocation request.

Stage 104: the business implementation server sends the service page to the third party development server, and the third party development server processes the service page and sends it to the user.

In stage 104, the third party development server processes the service page by embedding the service page into a page corresponding to the business request.

The method of implementing online business described above can be applied in various network environments in which the business implementation server may be a server installed in a corresponding network environment and used for controlling and managing the business implemented in the network environment. The third party development server may be an ISV server.

In one embodiment, if the Open API as requested to be invoked in the invocation request includes a plurality of Open APIs, then before sending the invocation request to the determined ISP server, i.e., before stage 102, the method may further determine an invocation relationship between the plurality of Open APIs.

The invocation relationship among the plurality of Open APIs indicates whether an invocation sequence exists among the plurality of Open APIs. According to one embodiment, the plurality of Open APIs may include Open APIs having an invocation sequence and may also include an independent Open API which shares invocation sequence with other Open APIs.

Figure 2:
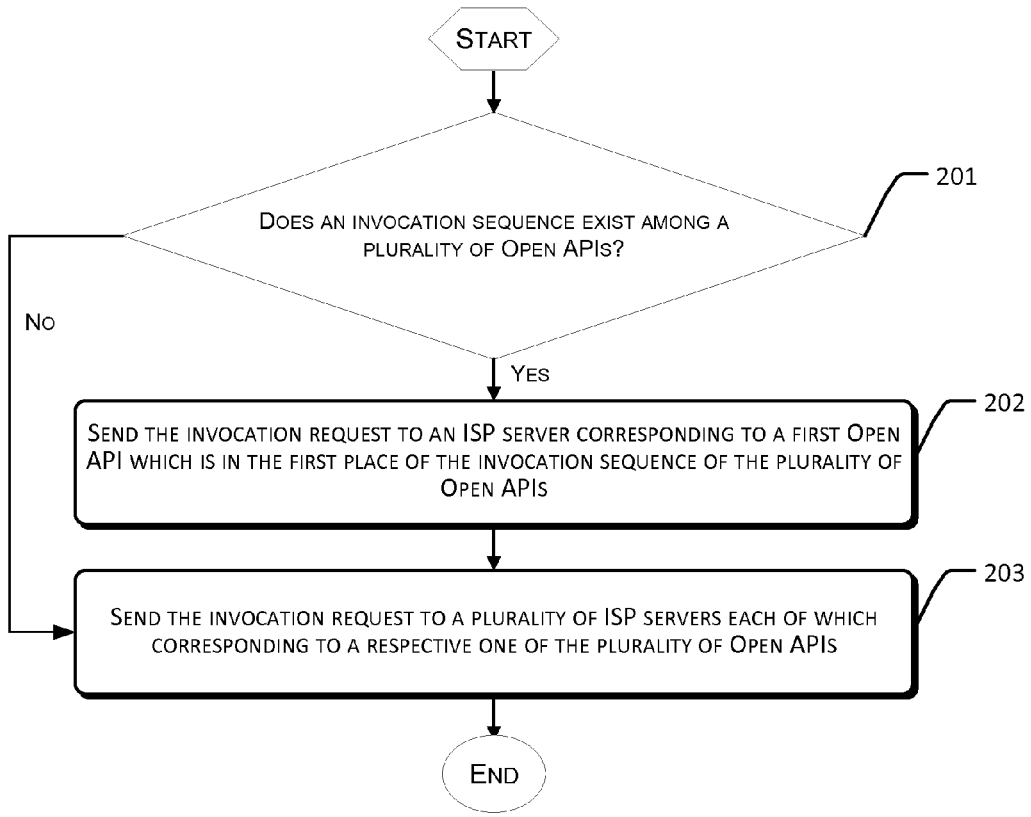
FIG. 2 is a flowchart of sending an invocation request to an ISP server in accordance with an embodiment of the present disclosure.

After determining the invocation relationship among the plurality of Open APIs, stage 102 of the process shown in FIG. 1 sends the invocation request to the determined ISP server, as shown in FIG. 2, which includes a number of stages as described below.

Stage 201: determining whether an invocation sequence exists among the plurality of Open APIs according to the invocation relationship that exists among the plurality of Open APIs. If an invocation sequence exists, the process proceeds to stage 202; otherwise, the process proceeds to stage 203.

Stage 202: sending the invocation request to an ISP server corresponding to a first Open API which is in the first place of the invocation sequence of the plurality of Open APIs, and proceeding to stage 103 of FIG. 1.

Stage 203: sending the invocation request to a plurality of ISP servers each of which corresponding to a respective one of the plurality of Open APIs, and proceeding to stage 103 of FIG. 1.

According to one embodiment, if the Open API as requested to be invoked in the invocation request includes a plurality of Open APIs and an invocation sequence exists among the plurality of Open APIs, a plurality of invocations are to be performed according to business logics until the last Open API of the invocation sequence is invoked. After performing the first invocation according to the invocation sequence and before sending the service page to the third party development server, i.e., before stage 104 of FIG. 1, the process may further embed the invocation sequence among the plurality of Open APIs in the service page.

Figure 3:
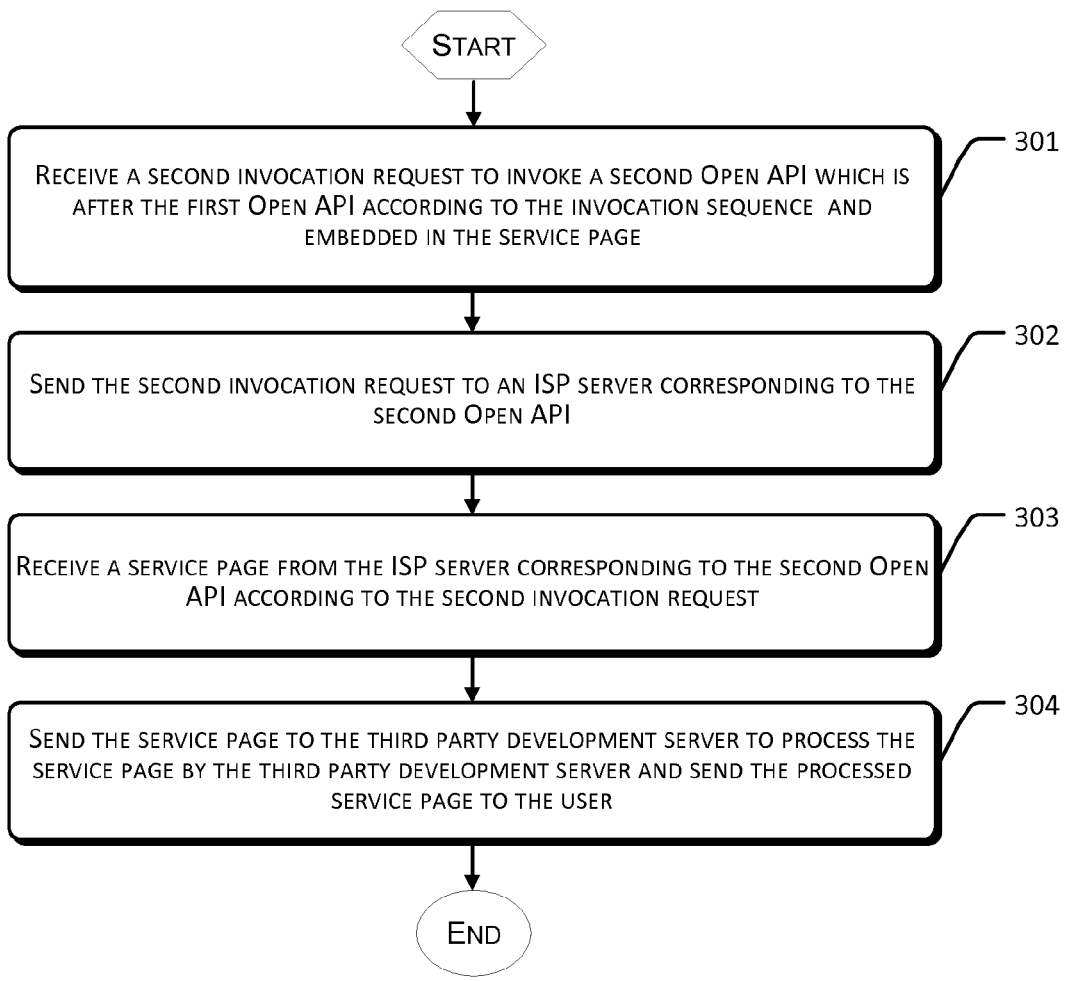
FIG. 3 is invocation flowchart 1 of triggering the next Open API in accordance with an embodiment of the present disclosure.

By performing the stages above, the invocation sequence among the Open APIs is embedded in the service page returned to the user, and the user can trigger the next Open API invocation flow, the process of which includes a number of stages as described below and as shown in FIG. 3.

Stage 301: the business implementation server receives an invocation request of a second Open API, which is after the first Open API, as triggered by the user according to the invocation sequence embedded in the service page.

Stage 302: sending the invocation request to an ISP server corresponding to the second Open API.

Stage 303: receiving a service page, returned from the ISP server corresponding to the second Open API, according to the invocation request.

Stage 304: sending the service page to the third party development server which in turn processes the service page and sends it to the user.

Figure 4:
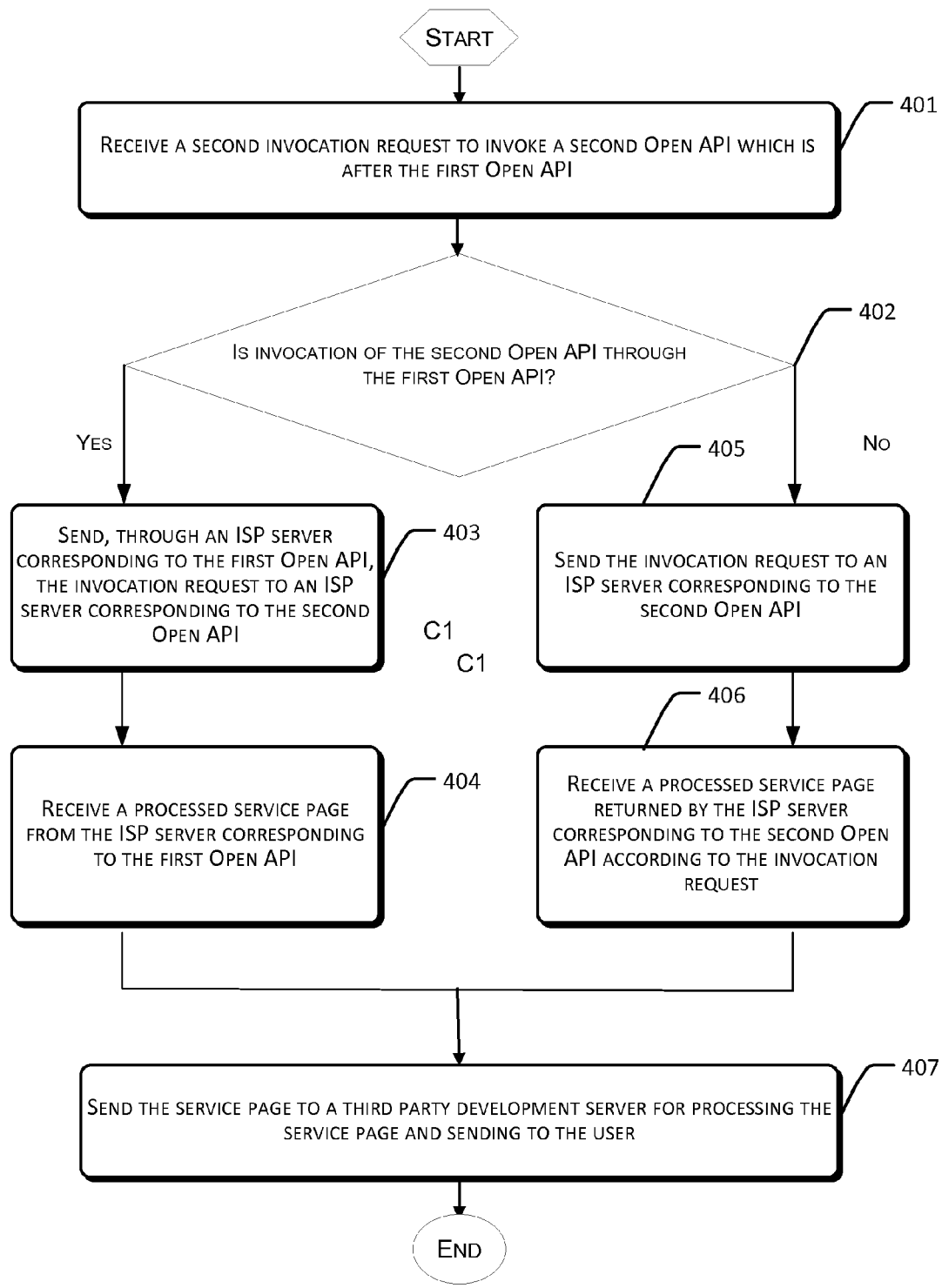
FIG. 4 is invocation flowchart 2 of triggering the next Open API in accordance with an embodiment of the present disclosure.

According to the process shown in FIG. 3, the business implementation server implements the invocation process for the invocation request according to the next Open API invocation request triggered by the user. According to one embodiment, after the user triggers the invocation process for the next Open API, inter-invoking between the ISP servers corresponding to different Open APIs may be supported. For example, for complicated businesses involving the interactions among a plurality of ISP servers, after invoking the business provided by the ISP server corresponding to the first Open API, the business provided by the ISP server corresponding to the second Open API may need to be invoked. However, the ISP server corresponding to the second Open API may only support access by certain ISP servers. Generally, these certain ISP servers are the ISP servers corresponding to the Open API which are invoked for the first time. Under such circumstances, the ISP server corresponding to the second Open API needs to be invoked through the ISP server corresponding to the first Open API, so as to obtain the business provided by the ISP server corresponding to the second Open API. Specifically, the business implementation server implements the invocation process of the invocation request according to the invocation request of the next Open API triggered by the user, which is shown as FIG. 4.

Stage 401: the business implementation server receives an invocation request for the second Open API, which is after the first Open API, as triggered by the user according to the invocation sequence embedded in the service page.

Stage 402: determining whether the second Open API needs to be invoked by the first Open API according to the invocation relationship among the plurality of Open APIs. If the second Open API needs to be invoked through the first Open API, then the process proceeds to stages 403~404; otherwise, the process proceeds to stages 405~406.

In stage 402, when an inter-invocation relationship exists between the first Open API and the second Open API, the invocation of the second Open API needs to be accomplished through the first Open API.

Stage 403: forwarding the invocation request to the ISP server corresponding to the second Open API through the ISP server corresponding to the first Open API.

Stage 404: receiving a processed service page returned from the ISP server corresponding to the first Open API, then proceeding to stage 407.

In stage 404 the ISP server corresponding to the first Open API receives a service page returned from the ISP server corresponding to the second Open API, and embedding the received service page into a service page of its own service page.

Stage 405: sending the invocation request to the ISP server corresponding to the second Open API.

Stage 406: receiving a service page returned from the ISP server corresponding to the second Open API according to the invocation request, and then proceeding to stage 407.

Stage 407: sending the service page to the third party development server which in turn processes the service page and sends it to the user.

According to one embodiment, embedding the service page returned from the ISP into the page corresponding to the business request may include embedding the service page in the page corresponding to the business request in the form of Iframe (Inner Frame).

The page being embedded in the form of Iframe is an Iframe element, which can be understood as a floating frame in the page. A set of frames provides the access authority to the content of Iframe. In actual implementations, the set of frames can be used to read and write the elements contained in the Iframe.

Iframe, also known as Inner Frame, is a technique of embedding a web page into an existing web page. The embedded web page is shown in a designated frame position of the existing web page. However, from the perspective of a user, it should not be discernible that the present web page comes from two different web pages. Thus, an embodiment of the present disclosure uses features of Iframe to render the web of the ISP service open, thus guaranteeing the security and quality of user experience.

According to an embodiment of the present disclosure, in order to enhance the security and controllability of business implementation, before determining an ISP corresponding to an Open API as requested to be invoked in the invocation request, i.e., stage 102 of the process shown in FIG. 1, the process may further authenticate the user who sends the business request, and perform stage 102 after the user passes the authentication.

Specifically, the authentication of the user who sends the business request can be performed in different ways, for example, by returning a login interface to the user, requesting the user submit a registered account and password through the login interface if the user is a registered user, requesting the user register first through the login interface if the user is not a registered user, and permitting the user's login after verifying the registered information.

In practical business implementations, generally speaking multiple interactions between the user and the network server are involved. In order to guarantee the validity of user's login, according to an embodiment of the present disclosure, after the user logs in successfully the process may further verify whether the user's login certification, which is updated each time when the user sends a business request, is valid. If it is valid, the user passes the authentication; otherwise, the user's business request is rejected. The user's login certification is created when the user logs in successfully. In practical business implementations, the creation and update of the user login certification may be implemented in the following way:

In some embodiments, the business implementation may be generally sent based on browsers. After the business implementation server verifies the user login, the cookie of the user's login certification which is generated in this login process, along with the time information of the cookie, is written into the browser. When the user accesses (for example, invoking Open API) again, while verifying the validity of the cookie, not only the existence of the user's identification will be verified but also a time interval between the current access and the last time the cookie was written into the browser so as to verify whether the time interval is within a predetermined time interval. In other words, the business implementation server can verify the cookie and refreshes the cookie every time when the Open API is invoked. If the user does not invoke an Open API for a long time, then next time the user will need to re-login in order to enhance the security of business.

According to an embodiment of the present disclosure, if the determined ISP server corresponding to the Open API as requested to be invoked in the invocation request comprises a plurality of ISP servers, then the invocation request is sent to the determined one or more ISP servers. This may comprise sending the invocation request to any one of the determined plurality of ISP servers.

Preferably, the act of sending the invocation request to any one of the determined plurality of ISP servers can be implemented by a random route algorithm. In other words, the invocation request is sent to any one ISP server of the determined plurality of ISP servers according to the random route algorithm. In the meantime, a "heartbeat" test of the ISP server may be performed, and a random list of ISPs is dynamically updated according to the ISP's status. For example, if the test result of an ISP indicates abnormal status of the ISP, the ISP will be deleted from the random list and the next time the invocation request will not be sent to the corresponding server. If the test result of the ISP indicates normal status of the ISP, the ISP will be added back to the random list and the next time the invocation request may be sent to the corresponding server.

In one embodiment, the ISP that provides business can be identified from a plurality of ISP servers through HTTP soft load.

HTTP soft load may be implemented based on a middleware Config Server (i.e., the business implementation server). Each ISP server registers HTTP service to Config Server. The client side of Config Server randomly connects ISP servers and sends HTTP requests based on the registered address of the Config Server. Each ISP service publishes its address information to the Config Server through a server side target, and each client side subscribes to the necessary service of the Config Server through a client side target. The Config Server pushes a list of all new and available services to the client side, and the client side selects one service address for invocation through a route algorithm (could be a random route algorithm). Specifically, the list of addresses sent to the Config Server can be presented by character strings.

According to an embodiment of the present disclosure, the service page returned from the ISP server can optionally be in two forms as described below.

Form 1: The ISP server returns a service page, and the ISV embeds the service page returned from the ISP into its own service page. The final resulting page returned to the user is presented in a domain name corresponding to an ISP Application, i.e., software developed by a developer. In other words, the domain name of the ISP application is embedded in the results page returned to the user to render the domain name visible to the user being the domain name of the ISP application.

Form 2: The ISP server renders the service page according to the link between the page head and page tail as obtained, elaborates the service page, and returns the web page to the business implementation server. The final resulting page returned to the user is presented as the domain name corresponding to the business implementation server. The link between the page head and page tail is the parameter information inputted by ISV's application by invoking API, and elaborating the service page comprises generating a complete page based on the parameter information.

According to an embodiment of the present disclosure, the present disclosure can meet different business requirements. For example, there may be some business needs that require the domain name of the business implementation server to be presented to the user in order for the business process to proceed further. As an illustration, in a refund operation the user is asked to input the user's password. In order to minimize security loophole and any consequential disputes, the window for the user to input the user's password needs to be presented below the page corresponding to the domain name of the business implementation server. The user inputs the password after confirming that the domain name is correct, so as to prevent the password from being stolen by a third party.

To facilitate better understanding of the techniques provided by the embodiments of the present disclosure, details of the embodiments are described in conjunction with specific examples of the business implementation server controlling the business implementation.

Figure 5:
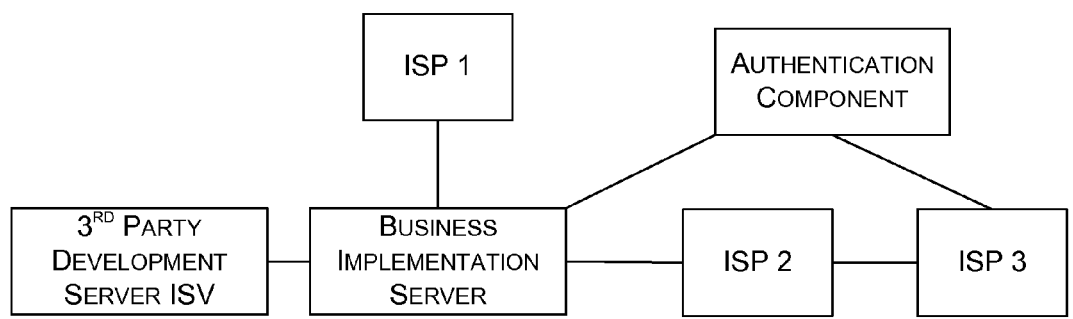
FIG. 5 is a diagram of interactions of systems of implementing online business in accordance with an embodiment of the present disclosure.

FIG. 5 is a diagram of interactions of systems of implementing online businesses in accordance with an embodiment of the present disclosure. The main components involved comprise a third party development server ISV, a business implementation server, a plurality of ISPs (three ISPs are shown in FIG. 5 for convenience), and an authentication component.

The invocation request issued by the ISV may include a page API invocation (i.e., invoking a plurality of Open APIs which have an invocation relationship) and a REST API invocation (i.e., invoking one or more Open APIs which do not have any invocation relationship with other Open APIs).

The business implementation server is responsible for the security of business implementation and flow control. As shown in FIG. 5, the business implementation server functions as a connector between one or more ISVs and one or more ISPs, and forwards an invocation request of invoking Open API from an ISV to a corresponding ISP. An API process comprises a plurality of operations of interactions with one or more ISPs, which may contain operations of page interactions and operations of regular REST API. Similarly, while processing a process flow page API, an ISP can invoke services provided by other ISPs, embed one or more pages provided by other ISPs into its own page, and return its page back to the business implementation server for the business implementation server to forward it to the ISV.

The authentication component is responsible for different authentication processes such as, for example, the business implementation server's authentication of an ISV, an ISP's authentication of the business implementation server, etc.

Figure 6:
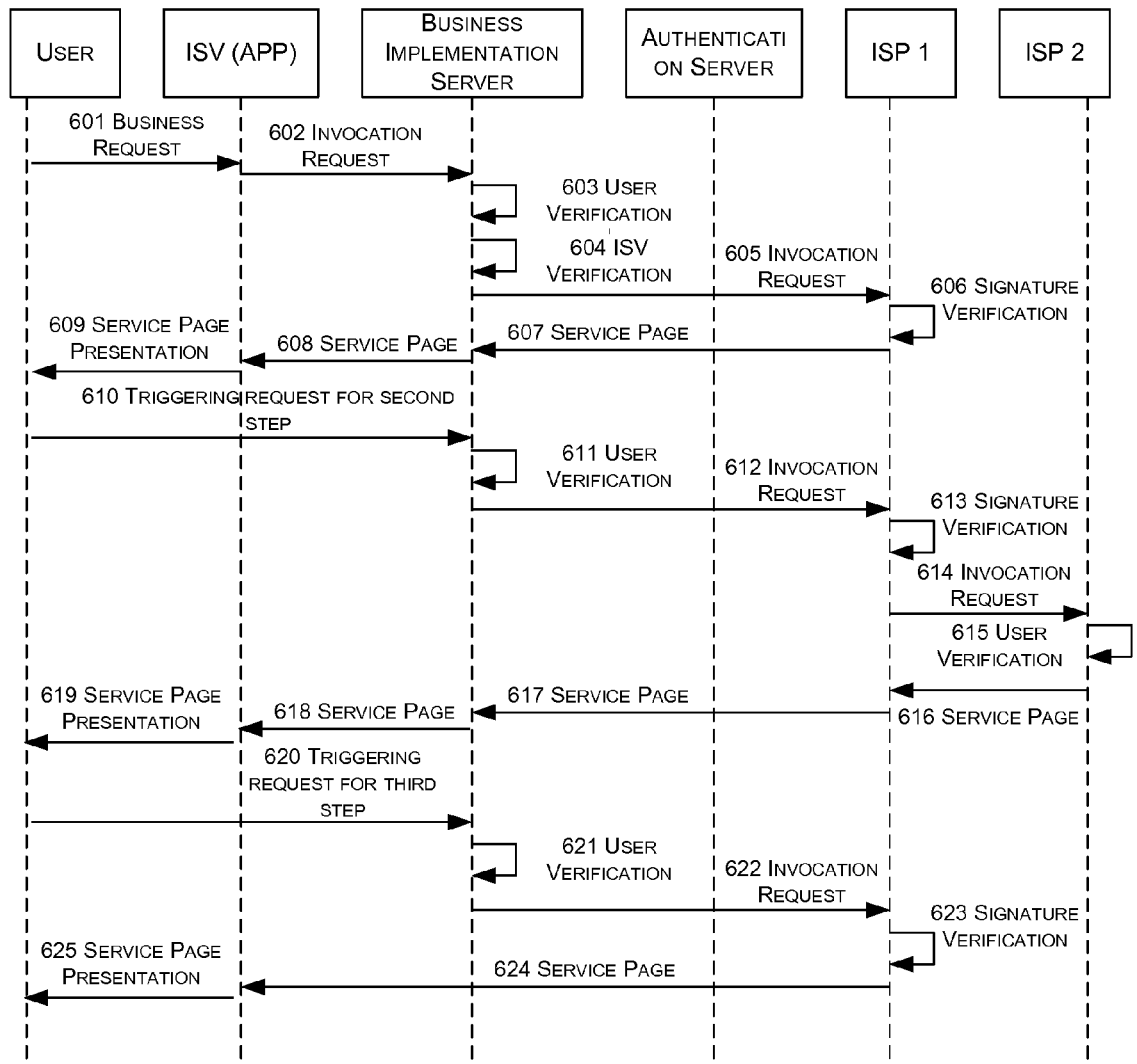
FIG. 6 is flowchart 2 of a method of implementing online business based on Open API in accordance with an embodiment of the present disclosure.

FIG. 6 illustrates an embodiment of implementing business based on Open API. Here, the business flow needs to invoke an Open API three times, and ISP2's service needs to be invoked in the second operation in response to ISP1.

Stage 601: The user issues a business request to the ISV.

In this stage, the business request issued by the user may include bidding requests, refund requests, etc. The user needs to log in before issuing such business requests.

Stage 602: The ISV issues an invocation request to Open API through an application APP.

In this stage, the invocation request comprises necessary parameters for invoking API and signature information for these parameters.

Stage 603: The business implementation server verifies the user login information and cookies after receiving the request. If the verification passes, the process proceeds to the next stage; otherwise, the user's request is rejected (not shown).

Stage 604: The business implementation server verifies the access authority of the ISV. This may involve verifying whether the ISV is authorized to invoke the API and to control the flow. If the verification passes, the process proceeds to the next stage; otherwise, the invocation request is rejected (not shown).

Stage 605: The business implementation server determines whether to support ISP1 of the Open API by analyzing the invocation request, and forwards the invocation request to the ISP1 server.

Stage 606: The ISP1 server verifies the signature of the business implementation server after receiving the invocation request. If the signature passes the verification, the process proceeds to the next stage; otherwise, an error message is returned (not shown).

Stage 607: The ISP1 server returns the service page to the business implementation server.

Stage 608: The business implementation server embeds the service page returned from ISP1, and returns it back to the ISV's APP.

Stage 609: The ISV's APP embeds the returned service page into its own application page and presents it to the user.

Stage 610: The user clicks on the returned service page and triggers a request for a second step of the process. The request is sent to the business implementation server directly.

Stage 611: The business implementation server authenticates the user after receiving the request. If the authentication passes, the process proceeds to the next stage; otherwise, an error message is returned (not shown).

Stage 612: The business implementation server forwards the request to the ISP1 server upon analyzing the invocation request.

Stage 613: The ISP1 server verifies the signature of the business implementation server after receiving the invocation request. If the signature passes the verification, the process proceeds to the next step; otherwise, an error message is returned (not shown).

Stage 614: The ISP1 server determines that it needs to invoke the service provided by ISP2 upon analyzing the request, and sends a request of invoking ISP2 to the ISP2 server.

Stage 615: The ISP2 verifies the user's identification through the authentication component which verifies the user's cookie. If the verification passes, the verified result is returned to the ISP2 server and the process proceeds to the next stage; otherwise, the process jumps to the user login page to ask the user to re-login (not shown).

Stage 616: The ISP2 server returns the service page to the ISP1 server in response to the service request.

Stage 617: The ISP1 server embeds the service page returned from the ISP2 server into its own page and returns its own page to the business implementation server.

Stage 618: The business implementation server embeds and forwards the service page returned from the ISP1 server to the ISV's APP.

Stage 619: The ISV's APP embeds the returned page into its own service page and presents its service page to the user.

Stage 620: The user clicks on the returned service page and initiates a third operation of the process. The request is sent to the business implementation server directly.

Stage 621: The business implementation server authenticates the user after receiving the request. If the authentication passes, the process proceeds to the next stage; otherwise, an error message is returned (not shown).

Stage 622: The business implementation server forwards the request to the ISP1 server upon analyzing the invocation request.

Stage 623: The ISP1 server verifies the signature of the business implementation server after receiving the invocation request. If the signature passes the verification, the process proceeds to the next stage; otherwise, an error message is returned (not shown).

Stage 624: The ISP1 returns its own service page to the ISV's APP.

Stage 625: The ISV's APP embeds the results page according to the result information returned from the ISP1 server, and presents the results page to the user.

In the above process, the business implementation server serves the functions of transition, forwarding, controlling and monitoring. When an external ISV issues a request to the business implementation server, the business implementation server verifies whether the ISV is authorized to access the page in response to receiving the request. If the verification result is positive, the business implementation server sends the request to an ISP and takes the ISP's verification of signature, analyzes data returned from the ISP, and returns the data to the external ISV. In one embodiment, HTTP may be adopted for invocation between the business implementation server and the ISP, i.e., the ISP may provide the HTTP service. The business implementation server accesses an ISP page through HTTP client side, and the ISP outputs the content of the ISP page to the business implementation server directly. In some embodiments, the business implementation server may perform a number of determinations after receiving an invocation request to invoke an Open API, as described below.

The business implementation server may determine whether the cookie in a browser is valid.

The business implementation server may determine whether the Sign parameter is legitimate. The Sign parameter is used for verifying the data introduced from the ISV user. The Sign parameter is generated according to an algorithm agreed by both the ISV and the business implementation server before the ISV invokes API, and is introduced during API invocation.

The business implementation server may determine whether the Appkey parameter is legitimate, and whether the Appkey parameter has the access authority to the current page API. The certification and key of the application of accessing every API is referred to as the Appkey parameter (including Appkey and APP Secret) and is used to certify and control the security for each application. The Appkey parameter is introduced when the ISV invokes the API.

The business implementation server may determine whether the Session parameter corresponds to the user of the cookie. When the application developed by the ISV obtains the information provided by the business implementation server, it is necessary for the user to log in before obtaining the information if the information is private information of the user. The user obtains the Session parameter (the Session key) after logging in to indicate that the data is reachable under the user's authorization. The information is generated when the user logs in and is introduced during API invocation.

The business implementation server may determine whether a time interval between the Timestamp parameter and the current time is within 30 minutes. The Timestamp parameter is used to control the number of times the ISV application accesses the API, and is generated by the business implementation server. It is written into the user's browser cookie, and the user reads the cookie to obtain it when accessing API through a page visit.

The business implementation server may determine whether the user corresponding to the Session parameter has the authorization to access the corresponding Appkey parameter.

If any of the aforementioned determinations yields a negative result, authentication of the user does not pass.

Furthermore, in the above process, the authentication component provides a unified function of login verification. In some embodiments, the authentication component may exist as an independent server, which means the authentication component may use a domain name different from those of the business implementation server and the ISP. A cookie is written into the domain of the business implementation server. When authenticating other ISPs, it is only necessary to determine whether the cookie exists in the domain of the business implementation server. To allow other domains to access the cookie in the domain of the business implementation server, a P3P header may be used during the access.

Figure 7:
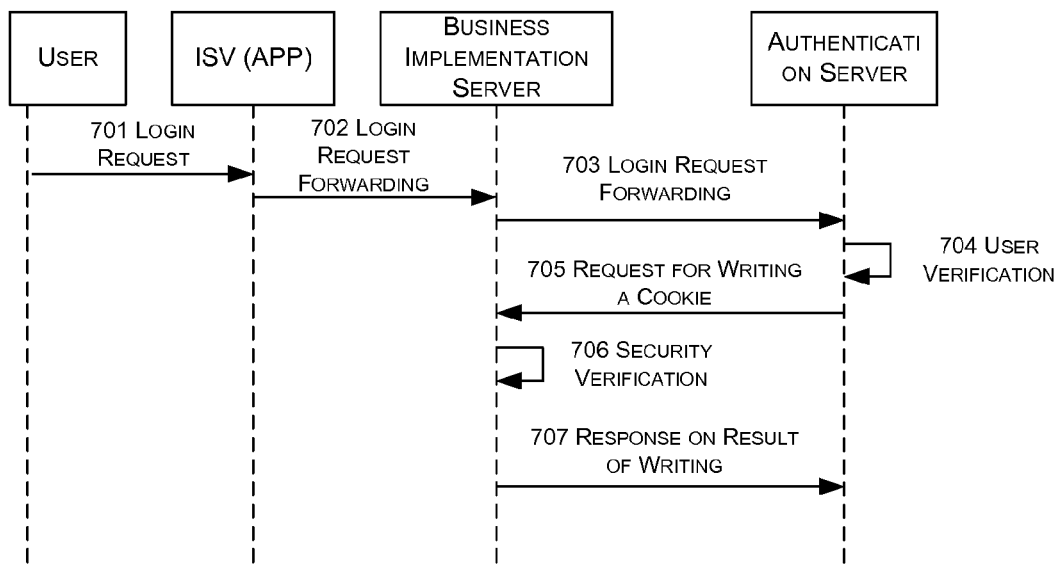
FIG. 7 is a flowchart of employing an authentication component to authenticate in accordance an embodiment of the present disclosure.

The process of using an authentication component for authentication is shown in FIG. 7, and may include a number of stages as described below.

Stage 701: A user sends a login request to an ISV.

Stage 702: The ISV forwards the login request to a business implementation server through APP and sends its own authentication parameter(s) to the business implementation server.

Stage 703: The business implementation server forwards the login request to an authentication component after receiving the request.

Stage 704: The authentication component jumps to the user login page after receiving the login request from the business implementation server. The user inputs the user's username and password. If the verification passes, the process proceeds to the next stage; otherwise, the process returns to the login page (not shown).

Stage 705: The authentication component issues a request for writing a cookie to the business implementation server.

Stage 706: The business implementation server performs security verification according to one or more parameters of the request after receiving the request. If the verification passes, the business implementation server writes the cookie.

Stage 707: The business implementation server returns a response on result of writing the cookie to the authentication component.

Figure 8:
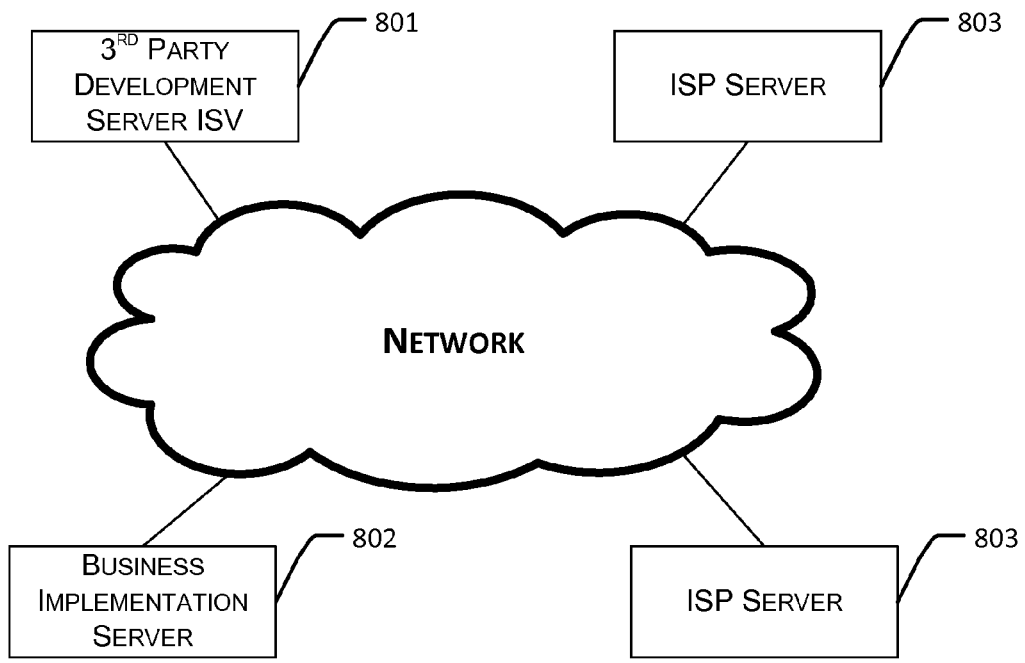
FIG. 8 is a diagram of a system of implementing online business based on Open API in accordance with an embodiment of the present disclosure.

The process of implementing online business based on Open API may be implemented as a system. As shown in FIG. 8, a network topology corresponding to a system of implementing online business based on Open API provided by the embodiment of the present disclosure is provided. The system may comprise: a third party development server 801, a business implementation server 802, and an ISP server 803. In some embodiments there may be a plurality of ISP servers. For convenience, only two ISP servers are shown in FIG. 8.

The user of the business implementation server 802 deploys and controls the online business. Specifically, each server accomplishes respective functions as described below.

The third party development server 801, according to a user's business request, sends an invocation request to invoke an Open API to the business implementation server 802. The third party development server 801 receives a service page returned from the business implementation server 802 and embedding the service page into a page corresponding to the business request for sending to the user.

The business implementation server 802, according to the invocation request sent by the third party development server 801, determines an ISP server 803 corresponding to the Open API requested to be invoked in the invocation request, and sends the invocation request to the determined ISP server 803. The business implementation server 802 receives a service page returned by the ISP server 803 and sends the service page to the third party development server 801.

The ISP server 803 returns a corresponding service page to the business implementation server 802 according to the invocation request sent by the business implementation server 802.

Figure 9:
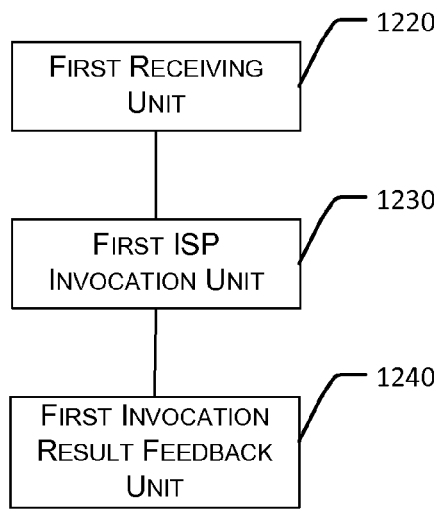
FIG. 9 is a diagram of apparatus 1 of implementing online business based on Open API in accordance with an embodiment of the present disclosure.

The process of implementing network business based on Open API can be implemented as an apparatus. As shown in FIG. 9, an apparatus of implementing online business based on Open API corresponding to the aforementioned process and the embodiments of the present disclosure is provided. The apparatus may comprise: a first receiving unit 901, a first ISP invocation unit 902, and a first invocation result feedback unit 903.

The first receiving unit 901 receives an invocation request to invoke an Open API sent by a third party development server according to a user's business request.

The first ISP invocation unit 902 determines an ISP server corresponding to the Open API as requested to be invoked in the invocation request received by the first receiving unit 901, and sends the invocation request to the determined ISP server.

The first invocation result feedback unit 903 receives a service page returned from the ISP server according to the invocation request sent by the first ISP invocation unit 902, and sends the service page to the third party development server. The third party development server processes the service page and sends the processed service page to the user. The third party development server processes the service page by embedding the service page into a page corresponding to the business request.

Figure 10:
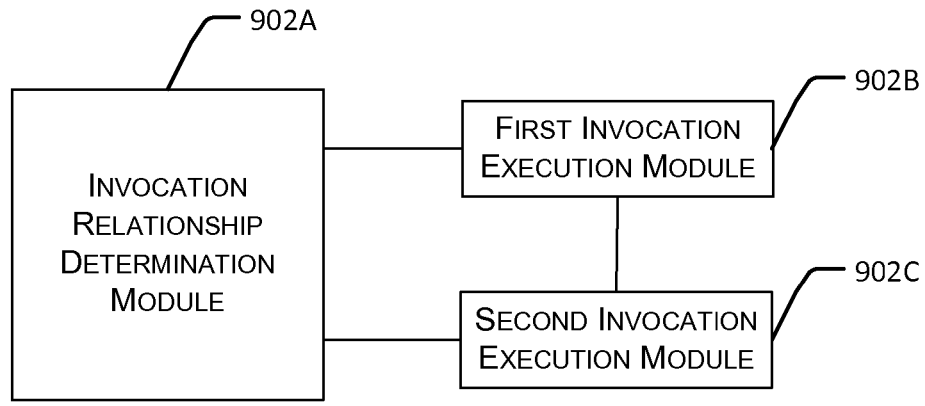
FIG. 10 is a diagram of structure 1 of a first ISP invocation unit in accordance with an embodiment of the present disclosure.

As shown in FIG. 10, according to one embodiment of the present disclosure, the first ISP invocation unit 902 may further comprise: an invocation relationship determination module 902A, a first invocation execution module 902B, and a second invocation execution module 902C.

The invocation relationship determination module 902A determines an invocation relationship among a plurality of Open APIs in an event that the Open API as requested to be invoked in the invocation request received by the first receiving unit 901 comprises the plurality of Open APIs.

The first invocation execution module 902B sends the invocation request to an ISP server corresponding to a first Open API, which is in a first place of an invocation sequence of the plurality of Open APIs in the event the invocation sequence is determined to exist among the plurality of Open APIs according to the invocation relationship determined by the invocation relationship determination module 902A.

The second invocation execution module 902C sends the invocation request to a plurality of ISP servers individually corresponding to the plurality of Open APIs, in the event that an invocation sequence is determined not to exist among the plurality of Open APIs according to the invocation relationship determined by the invocation relationship determination module 902A.

Figure 11:
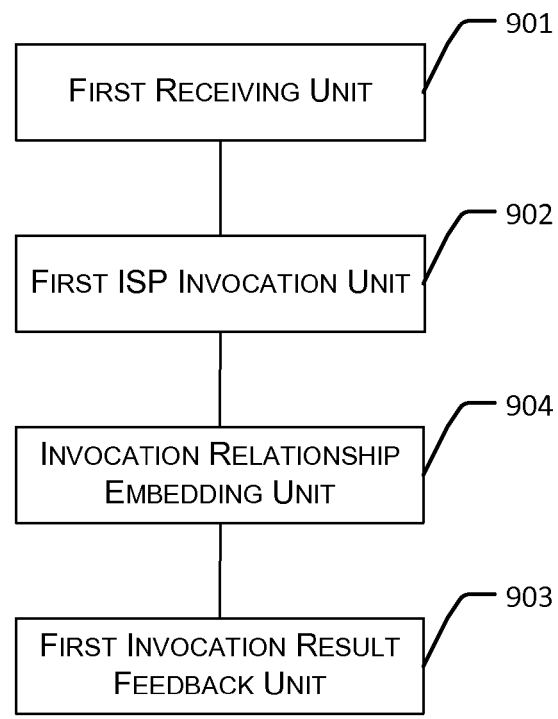
FIG. 11 is a diagram of apparatus 2 of implementing online business based on Open API in accordance with an embodiment of the present disclosure.

As shown in FIG. 11, according to an embodiment of the present disclosure, the apparatus shown in FIG. 9 may further comprise an invocation relationship embedding unit 904.

The invocation relationship embedding unit 904 embedding the invocation relationship among the plurality of Open APIs to the service page in the event that an invocation sequence is determined to exist among the plurality of Open APIs according to the invocation relationship. The invocation relationship embedding unit 904 then provides the embedded and processed service page to the first invocation result feedback unit 903.

Figure 12:
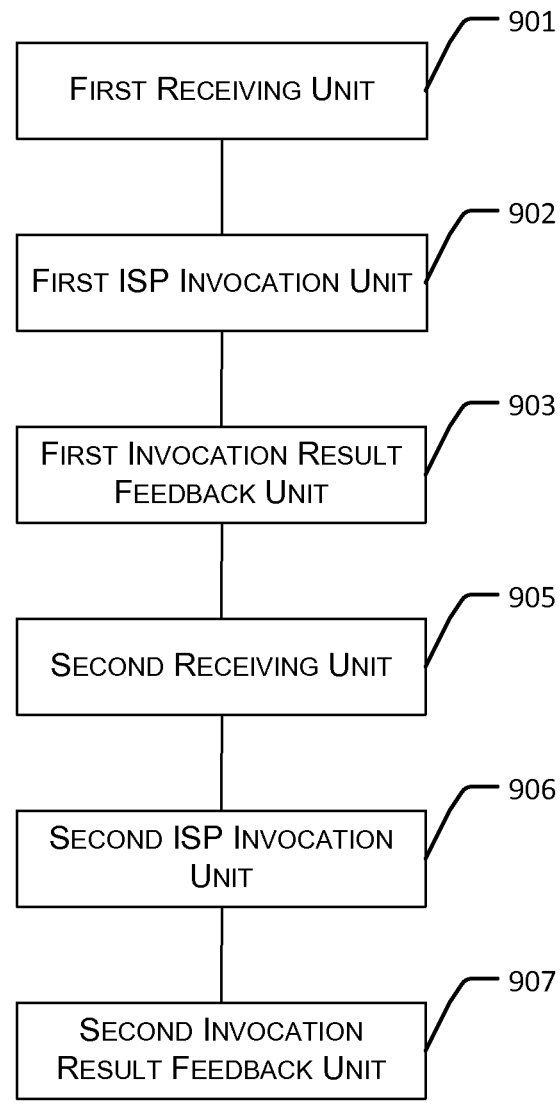
FIG. 12 is a diagram of apparatus 3 of implementing online business based on Open API in accordance with an embodiment of the present disclosure.

As shown in FIG. 12, according to an embodiment of the present disclosure, the apparatus shown in FIG. 9 may further comprise: a second receiving unit 905, a second ISP invocation unit 906, and a second invocation result feedback unit 907.

The second receiving unit 905 receives an invocation request to invoke a second Open API, which is after the first Open API and is triggered according to the invocation sequence embedded in the service page returned by the first invocation result feedback unit 903.

The second ISP invocation unit 906 sends the invocation request received by the second receiving unit 905 to an ISP server corresponding to the second Open API.

The second invocation result feedback unit 907 receives a service page returned from the ISP server corresponding to the second Open API according to the invocation request according to the second ISP invocation unit 906, and sends the service page to the third party development server. The third party development server processes the service page and sends the processed service page to the user.

Figure 13:
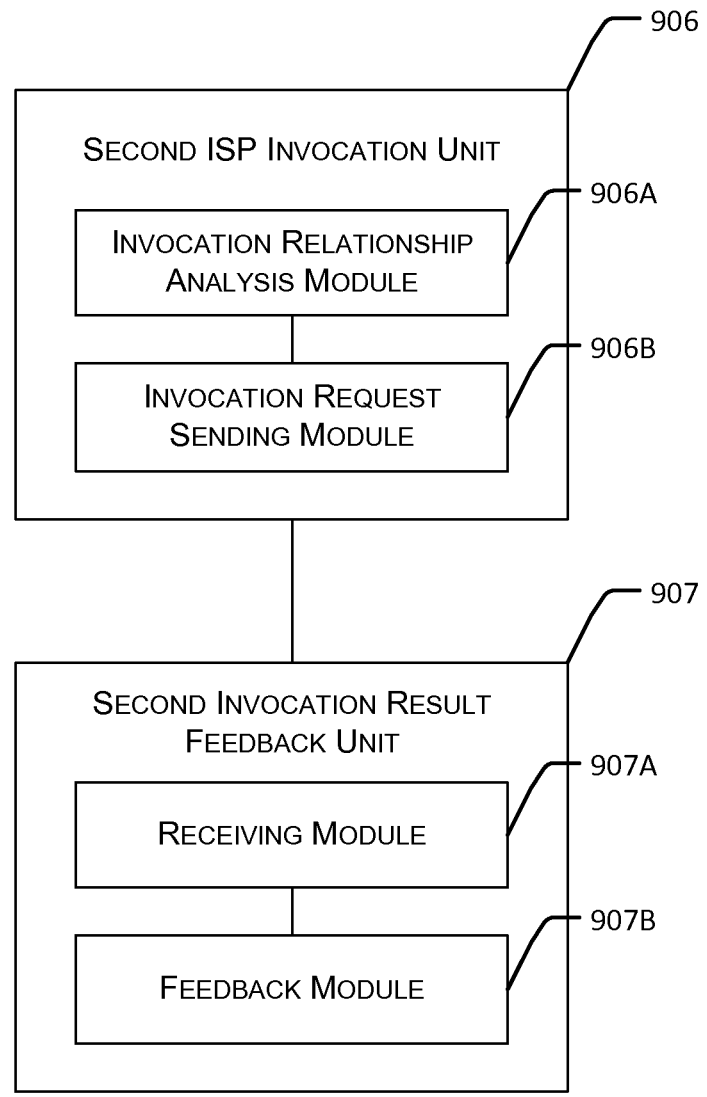
FIG. 13 is a diagram of a structure of a second ISP invocation unit and a second invocation result feedback unit in accordance with an embodiment of the present disclosure.

As shown in FIG. 13, according to an embodiment of the present disclosure, the second ISP invocation unit 906 in the apparatus shown in FIG. 12 may further comprise: an invocation relationship analysis module 906A and an invocation request sending module 906B.

The invocation relationship analysis module 906A determines whether the second Open API should be invoked through the first Open API, according to the invocation relationship among the plurality of Open APIs before sending the invocation request received by the second receiving unit 905 to an ISP server corresponding to the second Open API;

The invocation request sending module 906B forwards the invocation request to an ISP server corresponding to the second Open API, if an analysis result of the invocation relationship analysis module 906A is positive.

Correspondingly, in one embodiment, the second invocation result feedback unit 907 in the apparatus shown in FIG. 12 may further comprise: a receiving module 907A and a feedback module 907B.

The receiving module 907A receives a service page processed by and returned from the ISP server corresponding to the first Open API. The ISP server corresponding to the first Open API receives the service page returned from the ISP server corresponding to the second Open API, embeds the service page in its own service page, and returns its own service page to the receiving module 907A.

The feedback module 907B sends the service page received by the receiving module 907A to the third party development server, which processes the service page and sends the processed service page to the user.

Figure 14:
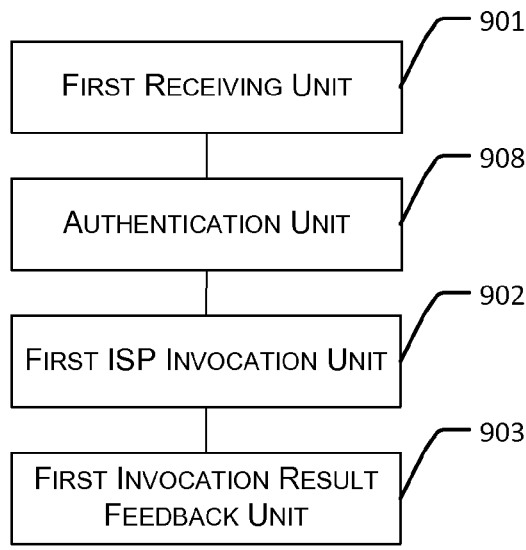
FIG. 14 is a diagram of apparatus 4 of implementing online business based on Open API in accordance with an embodiment of the present disclosure.

As shown in FIG. 14, according to an embodiment of the present disclosure, the apparatus shown in FIG. 9 may further comprise an authentication unit 908.

The authentication unit 908 authenticates the user who sends the business request, and instructs the first ISP invocation unit 902 to determine an ISP corresponding to the Open API as requested to be invoked in the invocation request.

Figure 15:
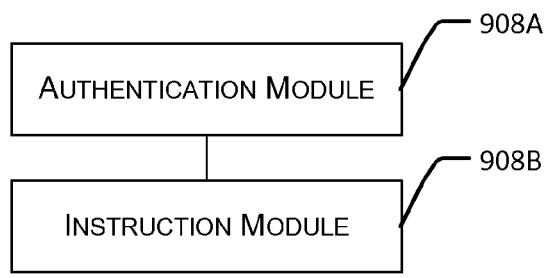
FIG. 15 is a diagram of a structure of an authentication unit in accordance with an embodiment of the present disclosure.

As shown in FIG. 15, according to an embodiment of the present disclosure, the authentication unit 908 in the apparatus shown in FIG. 14 may further comprise: an authentication module 908A and an instruction module 908B.

The authentication module 908A determines the user authentication if the user meets a setting condition. The setting condition comprises: creating a user login certification when the user logs in successfully; and determining the user login certification is valid, wherein the user login certification is updated each time when the user sends a business request.

The instruction module 908B instructs the first ISP invocation unit 902 to determine an ISP corresponding to the Open API as requested to be invoked in the invocation request, if the authentication module 908A determines the user is authenticated.

Figure 16:
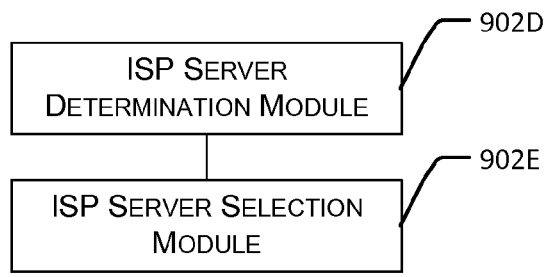
FIG. 16 is a diagram of structure 2 of a first ISP invocation unit in accordance with an embodiment of the present disclosure.

As shown in FIG. 16, according to an embodiment of the present disclosure, the first ISP invocation unit 902 in the apparatus shown in FIG. 9 may further comprise: an ISP server determination module 902D and an ISP server selection module 902E.

The ISP server determination module 902D determines the quantity of ISPs corresponding to the Open API as requested to be invoked in the invocation request.

The ISP server selection module 902E employs a random route algorithm to locate an ISP server in a plurality of ISP servers if the ISP determined by the ISP server determination module 902D comprises the plurality of ISPs, and sends the invocation request to the located ISP server.

A detailed description of the specific methods and/or means for implementing the function of the apparatus of implementing online business based on Open API provided by the embodiments of the present disclosure will not be provided as they have been explained in details in the corresponding stages of the processes described above.

The apparatus implementing online business based on Open API provided by the embodiments of the present disclosure may be independent standalone apparatus. In various applications, concerning simplification of network structures, the functions implemented by the apparatus may be integrated in the business implementation server. For example, the apparatus may be added in the business implementation server to act as a unit of implementing the aforementioned functions. Besides, the apparatus implementing online business based on Open API provided by the embodiments of the present disclosure may be implemented by computer-executable instructions. Persons of ordinary skill in the art can appreciate that the aforementioned modules can be defined or divided differently as long as the apparatus has the aforementioned functions and are protected by the claims of the present disclosure.

The present disclosure is described according to the flow charts and/or block diagrams of the method, apparatus (system) and computer-executable instructions of the embodiments. It should be understood that each process and/or block of the flow charts and/or block diagrams, and the combination of the processes and/or blocks of the flow charts and/or block diagrams, can be implemented by computer-executable instructions. These computer-executable instructions may be implemented on one or more general-purpose computers, one or more special-purpose computers, one or more embedded processors, or one or more other processors of programmable data processing equipment, so that an apparatus for implementing a process or multiple processes and/or a designated function of a block or multiple blocks in block diagrams can be generated by using computers or other processors of programmable data processing equipment to perform instructions.

These computer-executable instructions may be stored in one or more computer-readable storage media which may cause computers or other programmable data processing equipment to operate in a certain way. The instructions stored in the one or more computer-readable storage media of the computer can implement a process or multiple processes and/or a designated function of a block or multiple blocks depicted in the block diagrams.

These computer-executable instructions can be installed in one or more computers or one or more other programmable data processing equipment, so that a series of operations can be performed in the one or more computers or the one or more other programmable data processing equipment to implement the processes described above. Accordingly, the instructions performed in the one or more computers or the one or more other programmable data processing equipment provide steps of implementing a process or multiple processes and/or a designated function of a block or multiple blocks in depicted in the block diagrams.

By employing at least one of the aspects provided by the present disclosure, when implementing online business, a method may comprise: receiving, from a third party development server, an invocation request to invoke an Open API according to a user's business request; determining an ISP server corresponding to the Open API as requested to be invoked in said invocation request; sending said invocation request to said determined ISP server; receiving a service page returned from said ISP server according to said invocation request; sending said service page to said third party development server for processing said service page and sending the processed service page to said user, wherein said processing comprises embedding said service page into a page corresponding to said business request. Accordingly, concerning the security of data it is more secure to return service data to a third party development server through a service page than directly returning structural data to the third party development as is the case with conventional methods. Besides, the third party server does not need to analyze the business logics as all controllability to business is implemented by the servers between the third party server and the ISPs, and consequently the controllability is enhanced.

The present disclosure provides a limited number of exemplary embodiments. However, the present disclosure is not limited by these examples, and any changes proposed by persons ordinarily skilled in the art will be considered under the protection of the present disclosure.

What is claimed is:

1. A method comprising:
   receiving a request to invoke a plurality of Application Programming Interfaces (APIs) according to a transaction request, the plurality of APIs including a first API and a second API, a first service corresponding to the first API, and a second service corresponding to the second API;
   determining that an invocation sequence exists among the plurality of APIs, the invocation sequence including that an invocation of the first API precedes an invocation of the second API;
   determining a first Internet Service Provider (ISP) server that provides the first service corresponding to the first API;
   sending a first invocation request to the first ISP server;

receiving a service page corresponding to the transaction request returned by the first ISP server according to the first invocation request;
embedding the invocation sequence of the plurality of APIs in the service page;
triggering a second invocation request to a second ISP server that provides the second service corresponding to the second API according to the invocation sequence embedded in the service page;
sending the second invocation request to the second ISP server;
receiving via the service page a result from the second ISP server; and
sending the service page to a third party development server to process the service page.

2. The method as recited in claim 1, wherein before sending the second invocation request to the second ISP server, the method further comprises:
determining, according to an invocation relationship among the plurality of APIs, that the second API needs to be invoked through the first API;
sending the second invocation request to the first ISP server corresponding to the second Open API; and
receiving the service page from the first ISP server corresponding to the second API in response to the second invocation request by:
sending, from the first ISP server, the second invocation request to the second ISP server; and
receiving a processed service page by the first ISP server.

3. The method as recited in claim 1, further comprising embedding the service page into a page corresponding to the transaction request.

4. The method as recited in claim 1, wherein before determining the first ISP server, the method further comprises:
authenticating a user who sends the transaction request.

5. The method as recited in claim 4, wherein the authenticating the user who sends the transaction request comprises:
creating a user login identification when the user logs in successfully; and
determining whether the user login identification is valid when the user login identification is updated each time when the user sends a respective transaction request.

6. An apparatus comprising:
one or more data processing equipments; and
one or more memories having stored thereon computer-executable components that are executable by the one or more data processing equipments to perform acts including:
receiving a request to invoke a plurality of Application Programming Interfaces (APIs) from a third party development server according to a user's transaction request, the plurality of APIs including a first API and a second API, a first service corresponding to the first API, and a second service corresponding to the second API;
determining that an invocation sequence exists among the plurality of APIs, the invocation sequence including that an invocation of the first API precedes an invocation of the second API;
determining a first Internet Service Provider (ISP) server that provides the first service corresponding to the first API;
sending a first invocation request to the first ISP server;
receiving a service page corresponding to the transaction request returned by the first ISP server according to the first invocation request;
embedding the invocation sequence of the plurality of APIs in the service page;
receiving via the service page a result from the second ISP server; and
sending the service page to the third party development server to process the service page.

7. The apparatus as recited in claim 6, wherein the acts further include:
triggering a second invocation request to a second ISP server that provides the second service corresponding to the second API according to the invocation sequence embedded in the service page;
sending the second invocation request to the second ISP server; and
receiving via the service page a result from the second ISP server.

8. The apparatus as recited in claim 7, wherein the acts further include:
determining whether the second API should be invoked through the first API according to an invocation relationship among the plurality of APIs before sending the second invocation request to the second ISP server; and
forwarding the second invocation request to the second ISP server in an event that an analysis result of the invocation relationship analysis module is positive.

9. The apparatus as recited in claim 6, wherein the acts further include:
authenticating a user who sends the business request.

10. The apparatus as recited in claim 9, wherein the authenticating the user who sends the transaction request includes:
creating a user login certification when the user logs in successfully; and
determining the user login certification is valid, wherein the user login certification is updated each time when the user sends a business request.

11. A system comprising:
a transaction implementation server including:
one or more data processing equipments; and
one or more memories having stored thereon computer-executable instructions that are executable by the one or more data processing equipments to perform acts including:
receiving a request to invoke a plurality of Application Programming Interfaces (APIs) according to a transaction request, the plurality of APIs including a first API and a second API, a first service corresponding to the first API, and a second service corresponding to the second API;
determining that an invocation sequence exists among the plurality of APIs, the invocation sequence including that an invocation of the first API precedes an invocation of the second API;
determining a first Internet Service Provider (ISP) server that provides the first service corresponding to the first API;
sending a first invocation request to the first ISP server;
receiving a service page corresponding to the transaction request returned by the first ISP server according to the first invocation request;
embedding the invocation sequence of the plurality of APIs in the service page;
receiving via the service page a result from the second ISP server; and sending the service page to a third party development server to process the service page.

12. The system as recited in claim 11, wherein the acts further include sending the service page to a third party development server.

13. The system as recited in claim 11, wherein the first ISP server returns the service page to the transaction implementation server according to the first invocation request sent by the transaction implementation server.

14. The system as recited in claim 11, wherein the third party development server processes the service page and sends the processed service page to a user.

15. The system as recited in claim 11, wherein the third party development server processes the service page and sends the processed service page to request a user to trigger the invocation of the second service corresponding to the second API.

16. The system as recited in claim 11, wherein the plurality of APIs are open APIs.

17. The method as recited in claim 1, wherein the plurality of APIs are open APIs.

18. The apparatus as recited in claim 6, wherein the plurality of APIs are open APIs.

19. The apparatus as recited in claim 6, wherein the acts further include sending the processed service page to a user to request the user to trigger an invocation of the second service corresponding to the second API.

20. The method as recited in claim 2, wherein:
the service page is received by the first ISP server from the second ISP server; and
the service page is embedded in another service page of the second ISP server.

\* \* \* \* \*